United States Patent [19]

Watanabe et al.

[11] Patent Number: 5,679,304
[45] Date of Patent: Oct. 21, 1997

[54] METHOD OF MAKING A PUSH BUTTON WHICH IS UNBONDED TO A PANEL COVER

[75] Inventors: Nobuhisa Watanabe, Tokyo; Mikihiro Kuramitsu, Funabashi, both of Japan

[73] Assignee: Yoshida Industry Co., Ltd., Tokyo, Japan

[21] Appl. No.: 382,156

[22] Filed: Feb. 1, 1995

[30] Foreign Application Priority Data

Feb. 4, 1994 [JP] Japan ..................... 6-012713

[51] Int. Cl.$^6$ .......................... B29C 45/26; H01H 1/10
[52] U.S. Cl. .................. 264/242; 200/512; 200/517; 264/130; 264/132; 264/135; 264/264; 264/266
[58] Field of Search ..................... 264/264, 266, 264/242, 130, 135, 132; 200/512, 517

[56] References Cited

U.S. PATENT DOCUMENTS

| | | | |
|---|---|---|---|
| 3,584,162 | 6/1971 | Krakinowski | 200/517 X |
| 4,128,744 | 12/1978 | Seeger | 200/517 X |
| 4,130,615 | 12/1978 | Decker, Jr. et al. | 264/264 X |
| 4,349,712 | 9/1982 | Michalski | 200/517 X |
| 5,343,008 | 8/1994 | Ipcinski | 200/302.2 |

FOREIGN PATENT DOCUMENTS

| | | |
|---|---|---|
| 61-188590 | 11/1986 | Japan . |
| 63-59508 | 3/1988 | Japan . |
| 4-152986 | 5/1992 | Japan . |

Primary Examiner—Jan H. Silbaugh
Assistant Examiner—Mark Eashoo
Attorney, Agent, or Firm—Wenderoth, Lind & Ponack

[57] ABSTRACT

A method of manufacturing a panel button includes providing a molding die including a transferable molding die defining a cavity, a core molding die having a runner, a sprue and a gate and a stationary molding die having a sprue. A hollow space is provided in a bottom of the cavity wherein a push button is formed. A projecting portion is inserted into the cavity and is formed on the underside of the core molding die. Two hollow coaxial spaces are connected to each other, one to form a boss, the other to form an elastic arm. A plastic sheet is introduced into the cavity and is sandwiched between the transferable molding die and the core molding die. The plastic sheet has an unbonding portion at a position where the push button is to be formed. A molten resin material is injected into the cavity through the runner, sprue and gate. The thus formed panel button includes the push button on the plastic sheet.

4 Claims, 11 Drawing Sheets

METHOD OF MAKING A PUSH BUTTON WHICH IS UNBONDED TO A PANEL COVER

BACKGROUND OF THE INVENTION

1. Field of the Invention

The present invention generally relates to a method of manufacturing by injection molding a synthetic resin material and, more particularly, a panel button (or a panel switch) for a washing machine, a refrigerator or any other electric appliance.

In a conventional method of manufacturing a panel button of this type, there are prepared a plastic panel and a plastic sheet which might be bonded on the plastic panel. The plastic panel includes a hole or plural holes where push buttons are made, and the plastic sheet includes a boss or plural bosses made by pressure forming or vacuum forming. The plastic sheet is bonded on the plastic panel so that the bosses of the plastic sheet correspond to the holes of the plastic panel. According to such conventional method of manufacturing a panel button, after the plastic sheet and the plastic panel are made, the plastic sheet is bonded on the plastic panel and the bosses simultaneously are accurately positionally adjusted to the holes. Accordingly, the operation of manufacturing of the panel button is troublesome and requires dexterity of a worker and is inefficient. Also, it is so difficult to adjust the bosses to the holes, with the possibility of manufacturing inferior panel buttons with bosses and holes slightly out of alignment. Further, foams are liable to form between the plastic panel and the plastic sheet and the plastic sheet can become wrinkled. Furthermore, with the passing of time, the possibility exists that the plastic sheet will peel from the plastic panel.

Japanese Patent Application No. 5-132520 and Japanese Patent Application No. 5-145433 propose solutions to the above problems and relate to methods of injection-molding in which the plastic panel is formed on the underside of the plastic sheet and simultaneously the panel and sheet are bonded to each other.

As illustrated in FIG. 11A and 11B of the drawings, the first such method comprises the steps of introducing a plastic sheet 3 into a cavity 2 defined within a transferable (movable) molding die 1, and positioning a core molding die 7 on transferable molding die 1. The core molding die 7 includes a runner 4, a sprue 5, a pin point gate 6 and a projecting portion or boss 9 which protrudes from the underside of the core molding die 7. The boss 9 defines a hollow space 8. Then, a stationary molding die 11 is positioned on the core molding die 7. A synthetic resin is injected into cavity 2 defined within the transferable molding die 1 from a sprue 10 in the stationary molding die 11 through the runner 4, the sprue 5, and the gate 6 in the core molding die 7. Thus, a panel button is formed in a plastic panel 12 which is molded on the underside of the plastic sheet 3. The panel button includes a push button 14 portion of sheet 3 corresponding to the boss 9 and a plastic boss 13 bonded on the underside of the push button 14 and corresponding to the hollow space 8 defined the core molding die 7.

The second such method is by injection-molding as is the first method but differs from the first method by using a soft synthetic resin for molding the boss 13 which is on the underside of the push button 14. Since the boss 13 is made from a soft synthetic resin, the push button 14 can be pushed flexibly and with comfortable feel. A thin layer 15 which is made from a soft synthetic resin is formed around the boss 13 on the underside of the push button 14 in order to reinforce the push button 14.

In the first method, the boss 13 molded on the underside of the plastic sheet 3 is spaced from the plastic panel 12 surrounding the boss 13 as illustrated FIGS. 11(A) and 11(B). However, the plastic sheet 3 and the boss 13 forming the push button 14 are bonded to each other. Thus, when the push button 14 is pressed, pliability thereof depends on the flexibility on a small portion A of the plastic sheet 3 between the boss 13 and the plastic panel 12. Therefore, pressing can be difficult with an uncomfortable feel.

On the other hand, in the second method illustrated in FIG. 12, the boss 13 and the thin plastic layer 15 of the push button 14 are made from a soft synthetic resin but are bonded to the underside of the plastic sheet 3 unitarily. When the push button 14 is pressed, pliability thereof depends on the elasticity of the soft synthetic resin itself and is not sufficiently pliable for pressing the push button 14. As a result, stable contact of boss 13 with a switch (not shown) may not be achieved and there is the possibility that inferior panel buttons are manufactured.

In addition, both of the first and second methods have a problem that the core molding die 7 has the sprue 5 and gate 6 which are for both the plastic panel 12 and the boss 13. Thus, the molding die is complicated and expensive.

Accordingly, an object of the present invention is to provide a method of manufacturing a panel button for an electric appliance by injection molding and wherein a push button can be pressed flexibly.

SUMMARY OF THE INVENTION

A panel button for an electric appliance includes a plastic sheet, a plastic panel molded on an underside of the plastic panel sheet unitarily and integrally, a boss molded within a hole in the plastic panel and unbonded to the plastic sheet, and an elastic arm connecting the boss to the plastic panel. Preferably the elastic arm is spiral-shaped and is molded to extend around the axis of the boss or the elastic arm extends in an overhung orientation, and the boss and elastic arm are made from a same material simultaneously.

The panel button is manufactured by providing a molding die including a transferable molding die defining a cavity, a core molding die having a runner, a sprue and a gate and a stationary molding die having a sprue. A hollow space is defined in a bottom of the cavity at a position whereat a push button is to be formed. A projecting portion of the core molding die is inserted into the cavity. Two hollow coaxial spaces connected with each other are formed in the core molding die, one for forming the boss and the other for the elastic arm. A plastic sheet is introduced into the cavity and is sandwiched between the transferable molding die and the core molding die. The plastic sheet has an unbending portion positioned at a location at which the said push button is to be formed. A molten resin material is injected into the cavity through the runner, sprue and gate to thus form the panel button including the push button on the plastic sheet. Preferably, a bonding layer is provided on the entire underside of the plastic sheet except at an area thereof corresponding to the push button, or the bonding layer may cover the complete underside and an unbonding layer, on which a synthetic resin will not bond, may be provided on the bonding layer at the area corresponding to the push button.

According to still another aspect of the invention, an apparatus for forming a panel button for an electric appliance includes a transferable molding die defining a cavity, a core molding die having a runner, a sprue and a gate, and a stationary molding die having a sprue. A hollow space is provided at a bottom of the cavity wherein a push button is formed. A projecting portion on the underside of the core molding die can be inserted into the cavity. Two coaxial hollow spaces are connected to each other, one for a boss and the other for an elastic arm. A plastic sheet can be introduced into the cavity and sandwiched between the transferable molding die and the core molding die, and has an unbonding portion at a location at which the push button is to be formed.

DETAILED DESCRIPTION OF THE INVENTION

Figure 1:
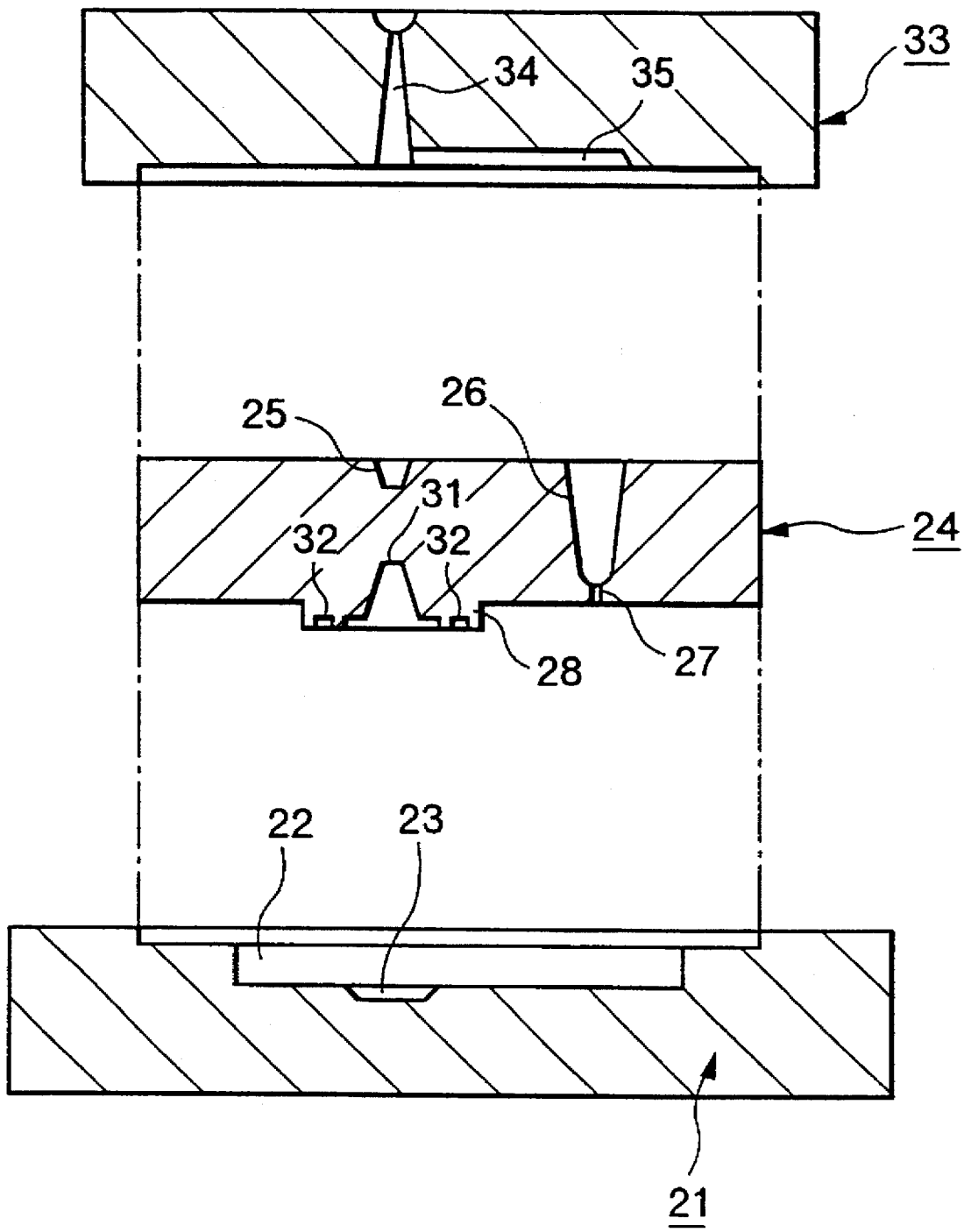
FIG. 1 is a sectional view of a injection molding die according to a first embodiment of the invention.

Referring first to FIG. 1 to FIG. 4 of the drawings, a molding die for injection molding according to a first embodiment of the invention includes a transferable molding die 21, a core molding die 24, and a stationary molding die 33. The transferable molding die 21 and the core molding die 24 define therebetween a cavity 22 of a shape corresponding to a configuration of a product to be molded. The upper surface of the transferable molding die 21 defining the cavity 22 is partly recessed to form a hollow space 23 in which a push button is formed.

Formed in sequence the core molding die 24 are a runner 25, sprue 26, and pin point gate 27. The core molding die 24 is provided on the underside thereof with a projecting portion 28 which can be inserted into the cavity 22. Hollow spaces 31, 32 are coaxial on the underside of die 24 and are connected to each other. The hollow space 31 will define a column-shaped boss 29, and the hollow spaces 32, which is formed in the undersurface of the projecting portion 28 will define spiral-shaped thin, elastic arms 30. The spaces 32 connect the space 31 to the cavity 22 on the outside of the projecting portion 28. The elastic arms 30 connect the boss 29 to a plastic pane 141. Formed through the stationary molding die 33 are a sprue 34 which is connected at one end to a nozzle of an injection molding machine (not shown) of any conventional type and a runner 35.

Figure 2:
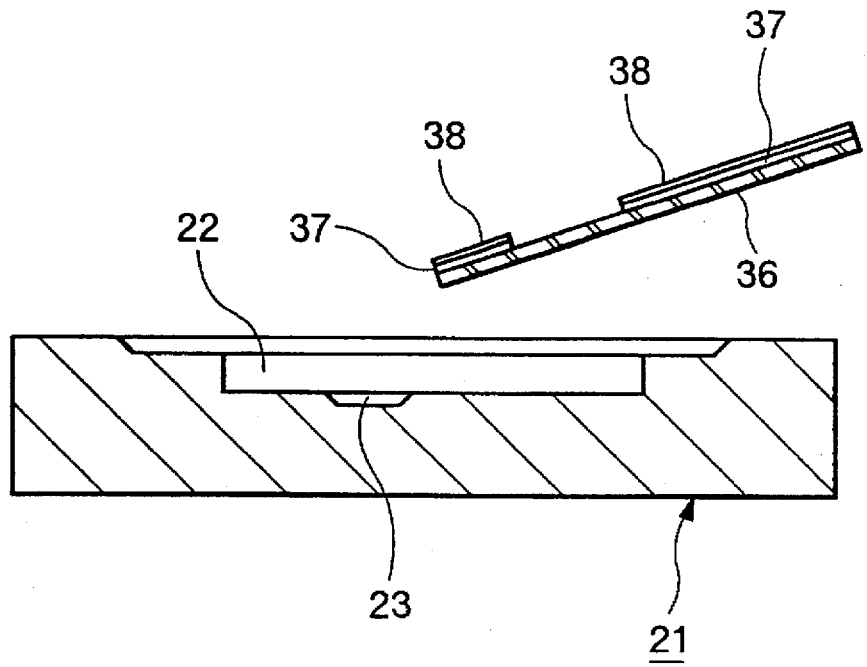
FIG. 2 is a sectional view showing a plastic sheet inserted into a molding die.
Figure 5A:
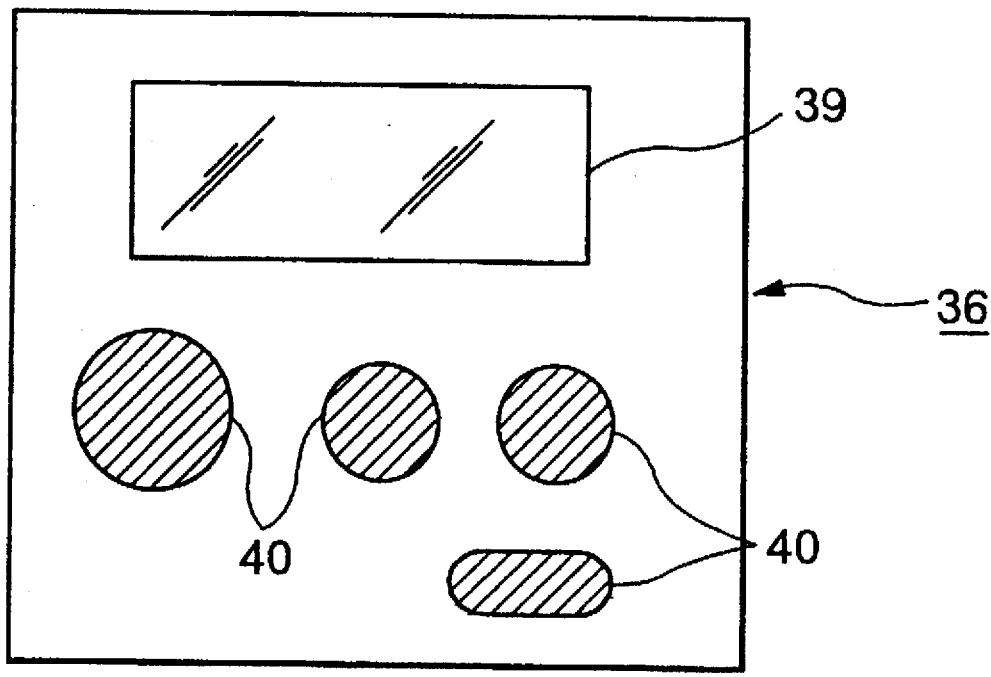
FIG. 5(A) is a top view of the plastic sheet.
Figure 5B:
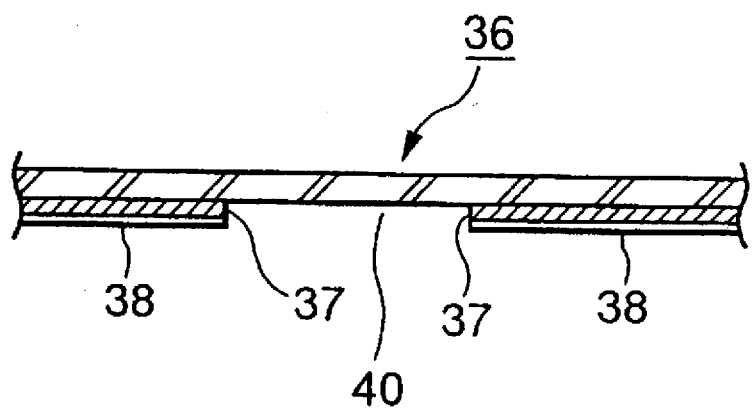
FIG. 5(B) is a partial cross sectional view of the plastic sheet.

A plastic sheet 36 is inserted into the cavity 22 of the transferable molding die 21 as illustrated in FIG. 2. The plastic sheet 36 has a shape that corresponds to the configuration of the bottom of the cavity 22. A printed layer 37 and a bonding layer 38 are on the underside (upperside in FIG. 2) of the plastic sheet 36. Printed layer 37 and bonding layer 38 are provided, as illustrated FIG. 2 and FIGS. 5(A) and 5(B), on the entire underside of the plastic sheet 36 except the portion thereof corresponding to the hollow space 23 (where the push button 40 will be formed) and a transparent window 39.

Figure 3:
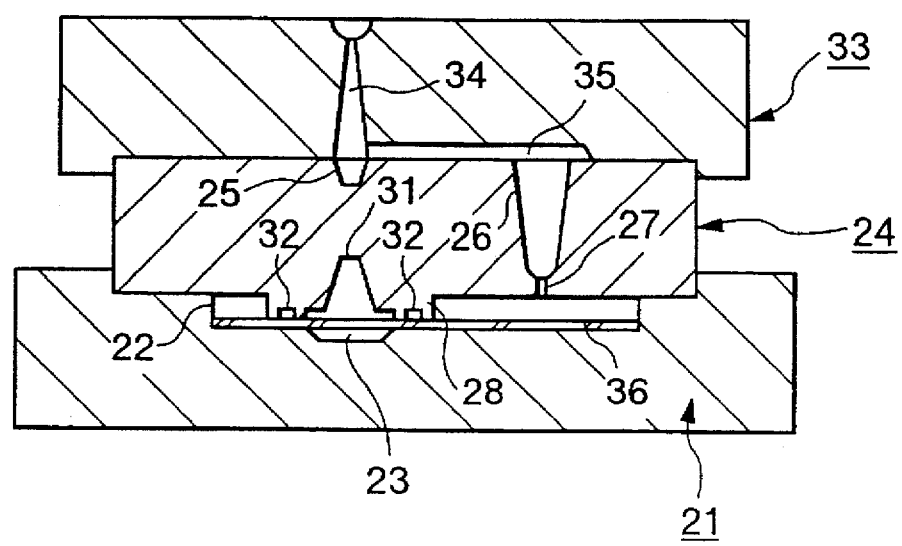
FIG. 3 is a sectional view of the molding die of FIG. 1 shown in a shut position.
Figure 4:
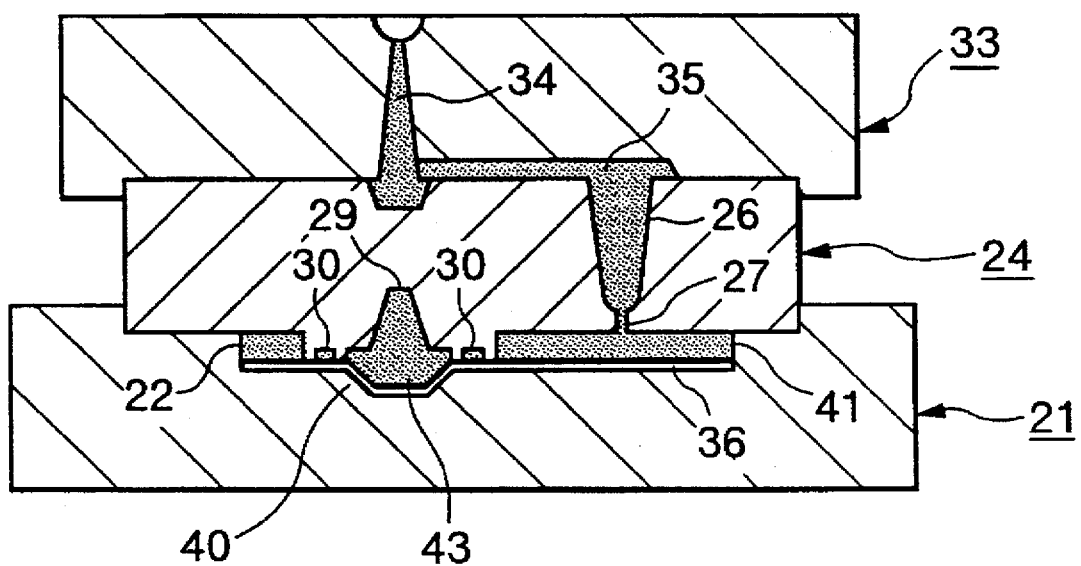
FIG. 4 is a sectional view similar to FIG. 3 but shown with injected synthetic resin.

A panel button and a method of manufacture thereof using the above injection molding die and the plastic sheet 36 will now be described. First, the plastic sheet 36 is introduced into the cavity 22 of the transferable molding die 21. Next, the transferable molding die 21 is joined to the core molding die 24 with the projecting portion 28 against the plastic sheet 36 as illustrated in FIG. 3. Then, as illustrated in FIG. 4, a molten resin is injected into the cavity 22 through the sprue 34, the runners 25, 35, the sprue 26 and the pin point gate 27. As a result, plastic panel 41 is unitarily molded on the underside of the plastic sheet 36 up to the projecting portion 28 of the core molding die 24. In addition, the column-shaped boss 29 is molded by the hollow space 31 defined in the projecting portion 28 of the core molding die 24 while the plastic panel 41 is molded, and also the elastic arms 30 connecting the boss 29 to the plastic panel 41 are molded. The boss 29 and elastic arms 30, which are molded on the underside of the plastic sheet 36, define a push button 40. Further, the push button 40 has a projecting portion 43 resulting from the hollow space 23 on the bottom of the cavity 22. The boss 29 and elastic arm 30 are not bonded (are unbonded) to the plastic sheet 36 since the plastic sheet 36 does not have a bonding layer 38 (or a printed layer 37) at the region corresponding to the push button 40.

Figure 6:
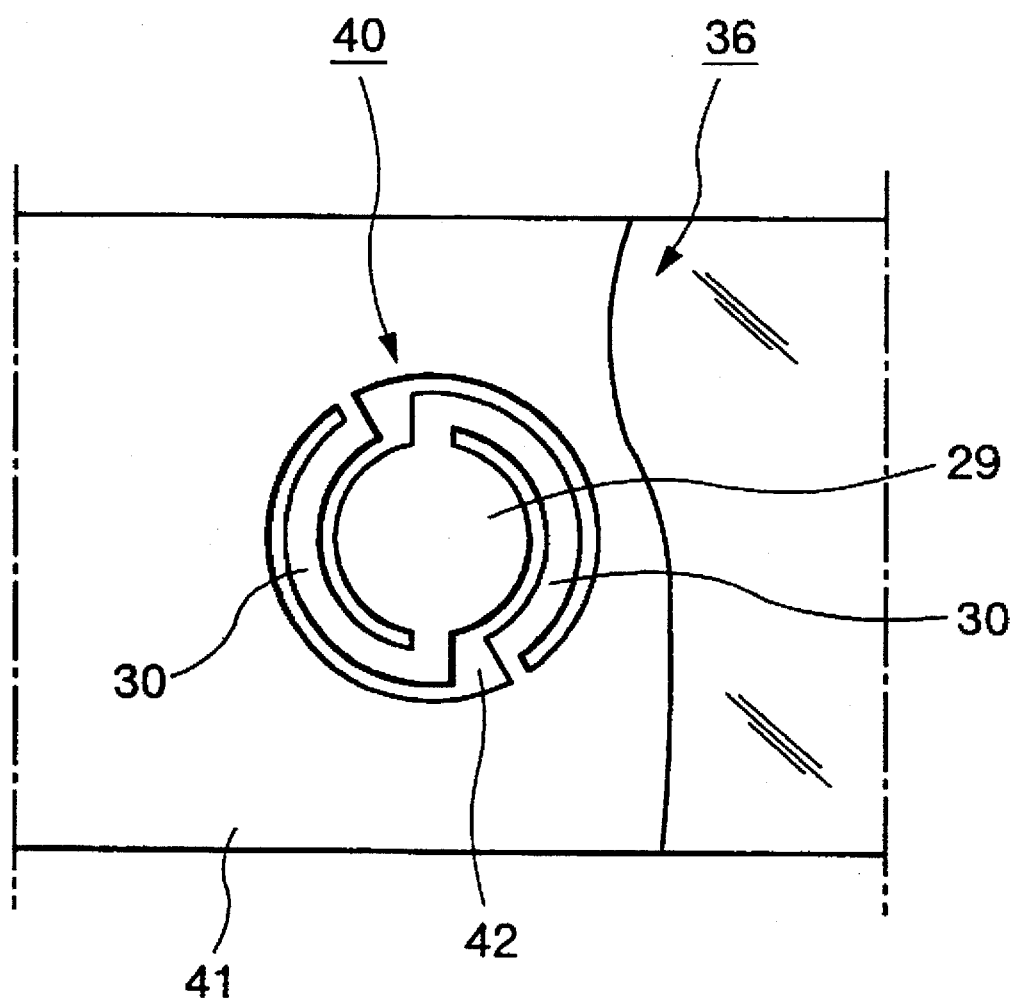
FIG. 6 is an enlarged top view of a push button with a panel button.
Figure 7A:
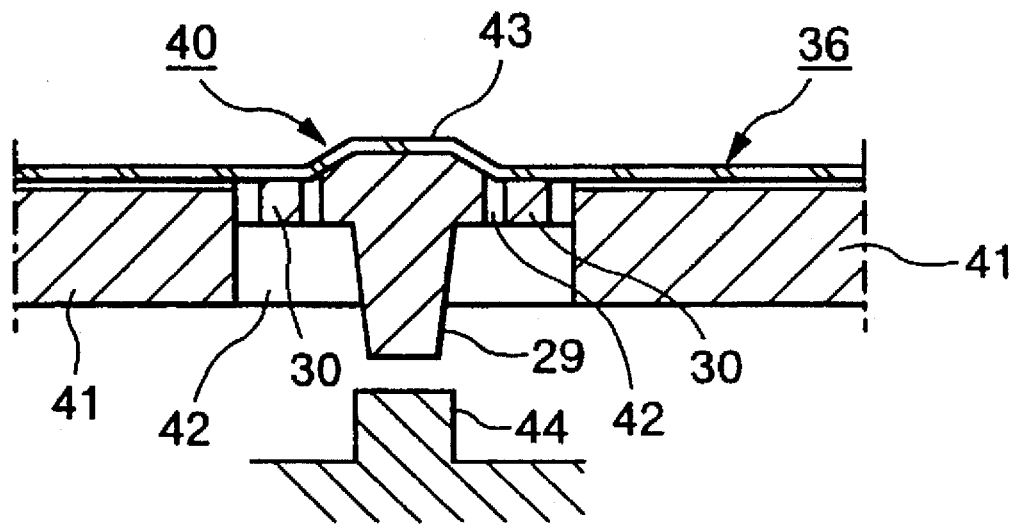
FIG. 7(A) is an enlarged sectional view of the push button.
Figure 7B:
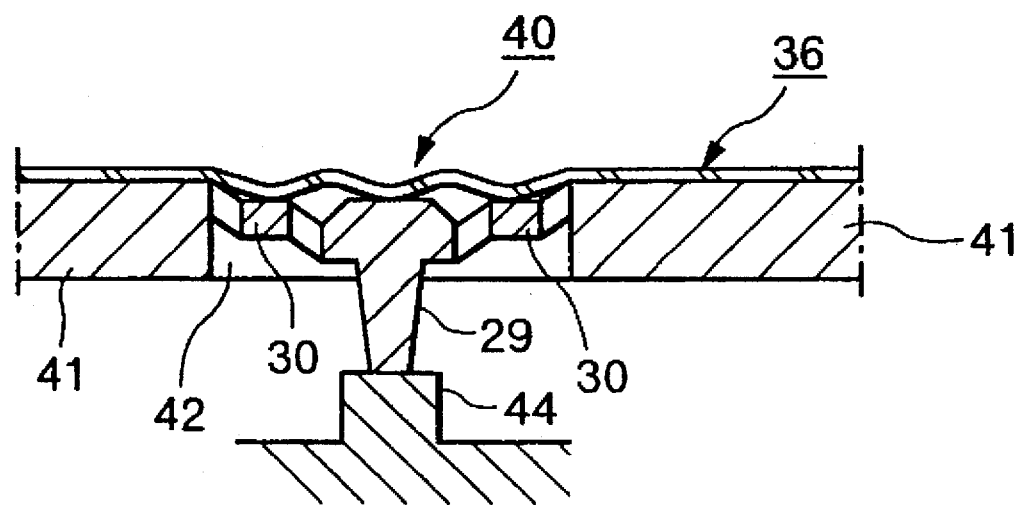
FIG. 7(B) is an enlarged sectional view similar to FIG. 7(A) but showing the push button pressed down.

Accordingly, the boss 29 of the push button 40 is, as illustrated in FIG. 6 and FIG. 7(A), connected flexibly to the plastic panel 41 by the thin elastic arms 30. Since boss 29 and elastic arms 30 are unbonded to the plastic sheet 36, when the push button 40 is pressed the pliability thereof depends on the elasticity of the plastic sheet 36 itself in a relatively large area corresponding to an annular gap or hole 42 surrounding boss 29 and the flexibility of the elastic arm 30, as illustrated in FIG. 7(B). Therefore, the boss 29 can be pressed smoothly, and the lower side thereof can contact a switch 44. When released, the push button 40 is returned to the original position by the elastic force of plastic sheet 36.

Figure 8A:
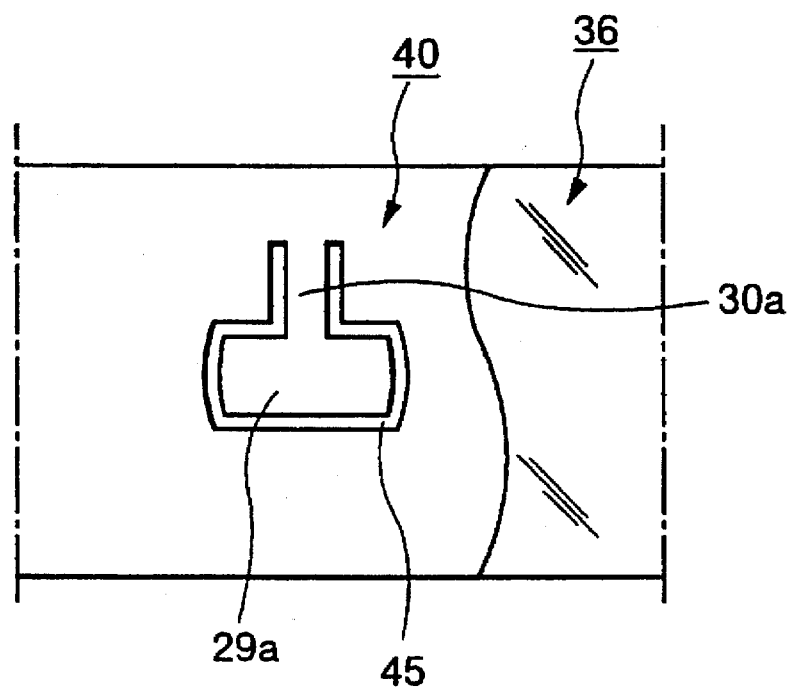
FIG. 8(A) is a top view of a push button according to a second embodiment of the invention.
Figure 8B:
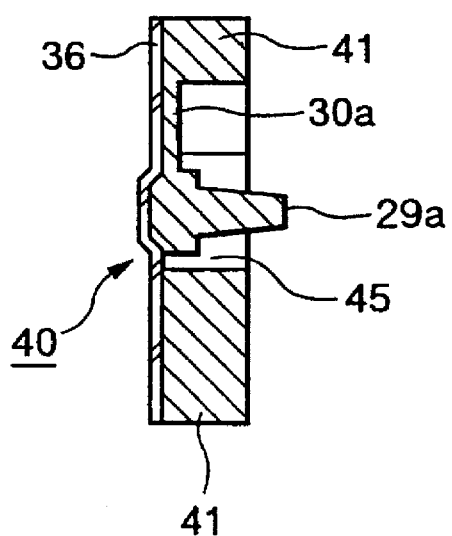
FIG. 8(B) is a sectional view of FIG. 8(A)
Figure 9A:
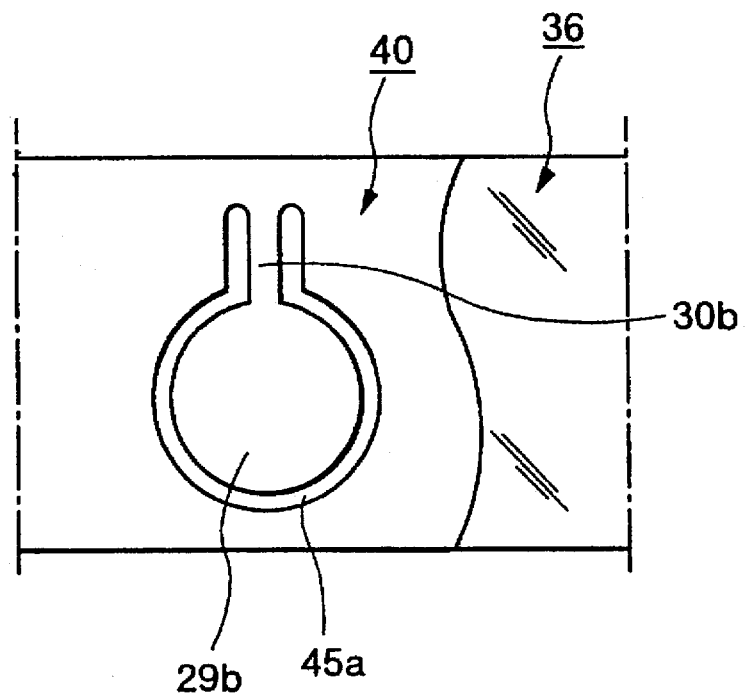
FIG. 9(A) is a top view of a push button according to a third embodiment of the invention.
Figure 9B:
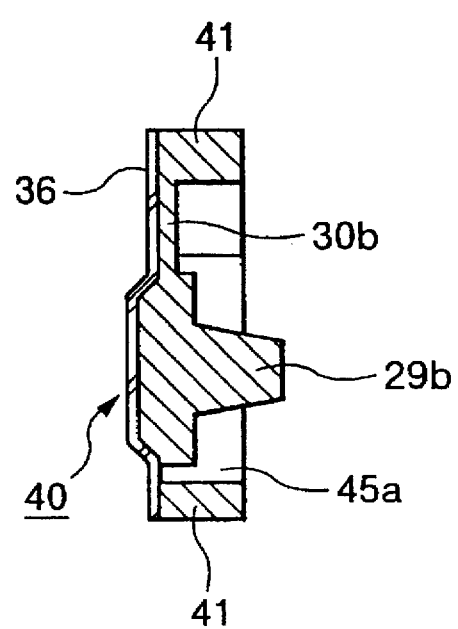
FIG. 9(B) is a sectional view of FIG. 9(A).

FIGS. 8(A) and 8(B) show another preferred embodiment of the invention which has two significant differences from the first embodiment previously described. A boss 29a is molded to be square or rectangular and is connected to the plastic panel 41 across a peripheral hole or gap 45 by an overhung elastic arm 30a. FIGS. 9(A) and 9(B) show a further preferred embodiment of the invention. A boss 29b is circle-shaped and is connected to the plastic panel 41 across a peripheral hole or gap 45a by an overhung elastic arm 30b.

Figure 10A:
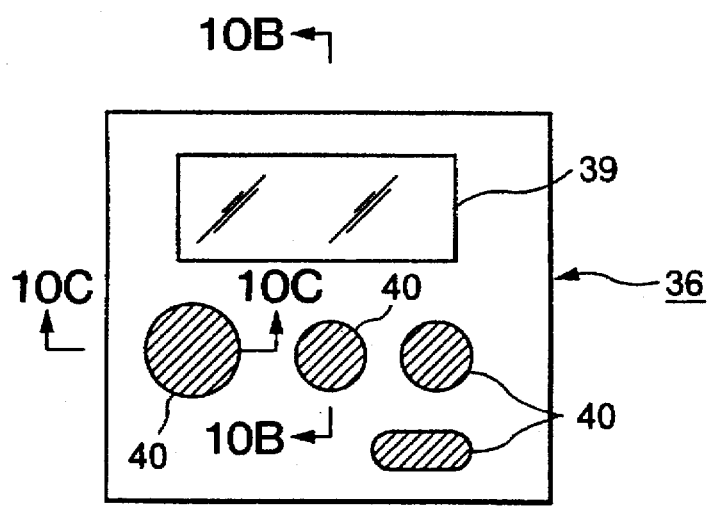
FIG. 10(A) is a top view of a plastic sheet according to a fourth embodiment of the invention.
Figure 10B:
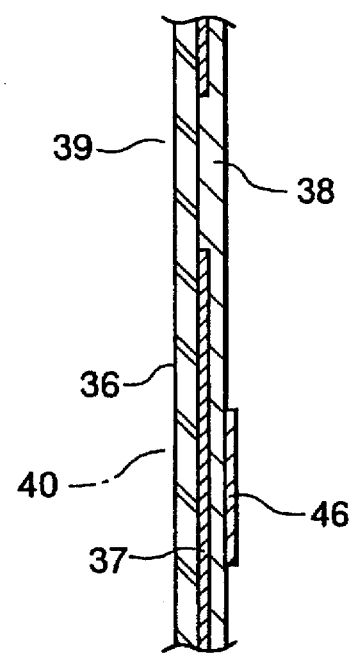
FIG. 10(B) is a sectional view taken along line 10B—10B of FIG. 10(A)
Figure 10C:
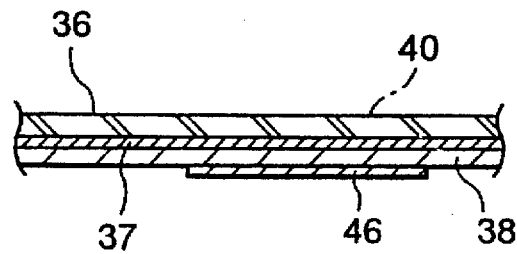
FIG. 10(C) is a sectional side view taken along line 10C—10C of FIG. 10(A)
Figure 11A:
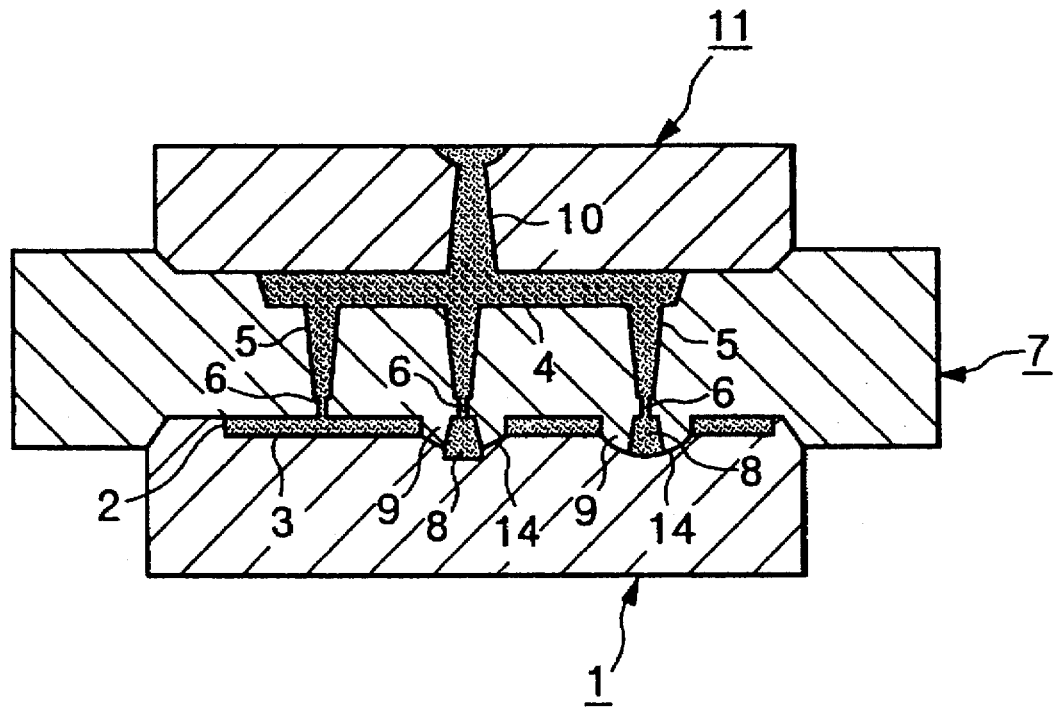
FIG. 11(A) is a sectional view of a first conventional injection molding die.
Figure 11B:
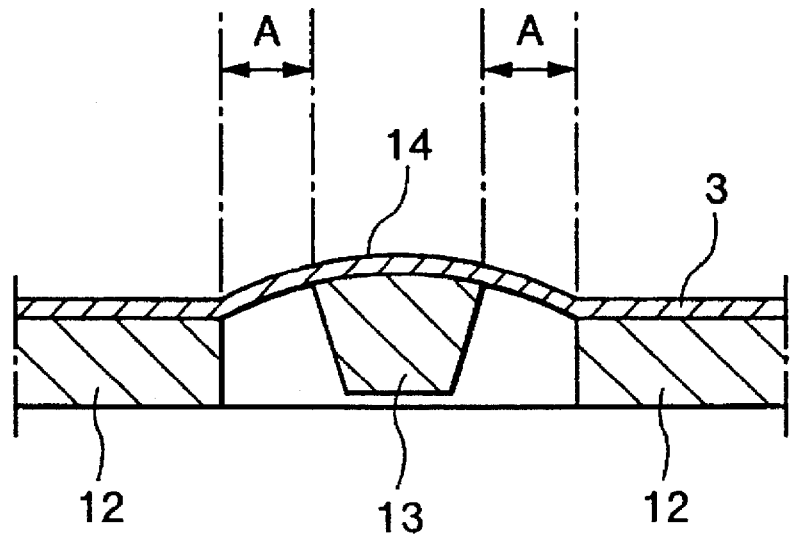
FIG. 11(B) is a enlarged sectional view of a push button produced by the die of FIG. 11(A)
Figure 12:
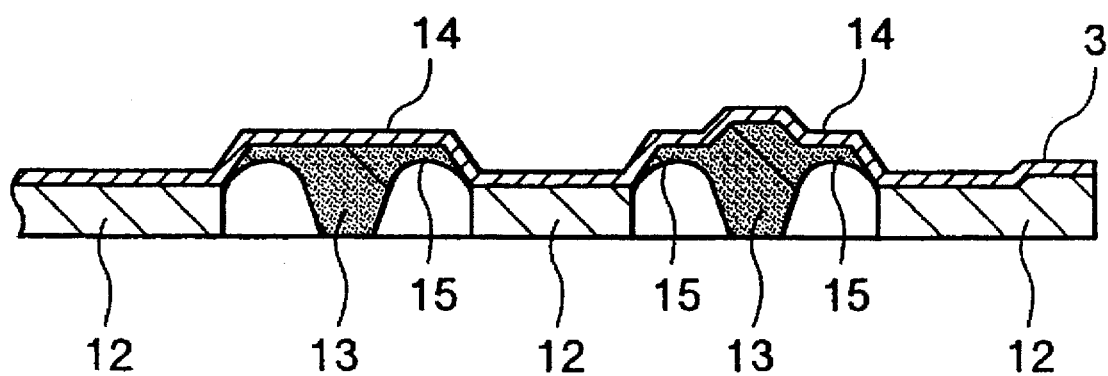
FIG. 12 is a sectional view of a push button produced by a second conventional die.

FIGS. 10(A), 10(B) and 10(C) show a plastic sheet 36 according to still another preferred embodiment of the invention. This plastic sheet 36 includes a transparent bonding layer 38 on its entire underside and an unbending layer 46 on which a synthetic resin will not bond at an area corresponding to the push button 40 corresponds on the underside of the bonding layer 38. When a synthetic resin is injected on the underside of the plastic sheet 36, the boss 29 when molded is not bonded to the plastic sheet 36. The printed layer 37 is provided except at the position corresponding the transparent window 39. Further, the printed layer 37 may be formed before the bonding layer 38 is formed, or the printed layer 37 and the bonding layer 38 may be made simultaneously by using a colored bonding agent which merges pigments or dyestuffs for printing into a bonding agent (not shown).

What is claimed is:

1. A method of manufacturing a panel button including a push button movable relative to a panel, said method comprising:

providing a molding die including a transferable molding die having therein a recess having at a bottom thereof a hollow space, a core molding die having a runner, a sprue and a gate and having a projecting portion having formed therein a first hollow space and a second hollow space surrounding said first hollow space and connected therewith, and a stationary molding die having a sprue;

positioning a plastic sheet within said recess of said transferable molding die;

positioning said transferable molding die, said core molding die and said stationary molding die relative to each other such that said plastic sheet is sandwiched between said transferable molding die and said core molding die, such that said transferable molding die and said core molding die define therebetween a cavity, and such that said projecting portion extends into said recess with said first hollow space of said projecting portion confronting said hollow space at said bottom of said recess and with said second hollow space connecting said first hollow space with said cavity;

injecting molten resin material through said sprue of said stationary molding die and said runner, sprue and gate of said core molding die into said cavity and from said cavity into said second hollow space and then into said first hollow space;

solidifying said resin material in said cavity, said first hollow space and said second hollow space; and bonding said resin material in said cavity to a portion of said plastic sheet therein while preventing bonding of said resin material in said second hollow space and said first hollow space to respective portions of said plastic sheet therein;

whereby the solidified resin material of said cavity bonded to said plastic sheet forms said panel of said panel button, the solidified resin material of said first hollow space not bonded to said plastic sheet forms said push button of said panel button, and the solidified resin material of said second hollow space not bonded to said plastic sheet forms an elastic arm flexibly supporting and connecting said push button to said panel.

2. A method as claimed in claim 1, wherein said bonding comprises providing a layer of bonding material on a surface of said plastic sheet facing away from said bottom of said recess.

3. A method as claimed in claim 2, wherein said preventing said bonding comprises not providing said layer of bonding material on a portion of said surface of said plastic sheet to confront said projecting portion.

4. A method as claimed in claim 2, wherein said preventing bonding comprises providing a layer of material to prevent bonding onto said layer of bonding material at a portion thereof to confront said projecting portion.

* * * * *